Aug. 8, 1933.   C. C. NELSON ET AL   1,921,770
MOTOR STARTING SYSTEM
Filed June 17, 1930    4 Sheets-Sheet 1

Fig.1.

INVENTORS
Carl C. Nelson and
Roy A. Crosby
BY
Pennie, Davis, Marvin & Edmonds
ATTORNEYS Patented Aug. 8, 1933

1,921,770

UNITED STATES PATENT OFFICE 1,921,770

MOTOR STARTING SYSTEM

Carl C. Nelson and Roy A. Crosby, Minneapolis, Minn., assignors to Electric Machinery Manufacturing Company, Minneapolis, Minn., a Corporation of Minnesota Application June 17, 1930. Serial No. 461,680

23 Claims. (Cl. 172—289)

This invention relates to electric motors and more particularly concerns improvements in starting methods and systems for use in connection with alternating current motors of the synchronous or induction types.

In the operation of polyphase synchronous or induction motors, it is customary to employ suitable means for starting the motor on reduced voltage or in some other manner to reduce the power consumption during the starting period. Thus it has been proposed to apply reduced voltage to the motor windings or to apply full voltage to a section only of such windings during the starting period and subsequently apply full voltage or to energize the entire primary windings when the motor speed has increased to a suitable value, the change to full energization being effected by means responsive to the motor speed. Systems of this type are described and claimed in Reissue Patent No. 17,180 to Truman F. Hibbard and in the Rupert N. Early patent applications, Serial No. 334,881, filed January 25, 1929 and Serial No. 430,702, filed February 24, 1930.

In certain applications and under certain adverse conditions, motors equipped with starting systems of the type referred to fail to develop sufficient torque to start when reduced voltage is applied thereto or when a part only of their primary windings is energized. When this condition is encountered, the automatic starting systems fail to start the motor and the current in the primary windings rises to excessive values, often resulting in injury to the motor and in any case, causing fluctuations of undesirable duration in the voltage of the power supply circuit.

With the above and other considerations in mind, it is proposed in accordance with the present invention to provide an improved starting system for synchronous or induction motors which automatically closes the running connections and so applies full voltage or full winding energization if the motor fails to start after the starting connections have been closed for a predetermined interval. The invention also contemplates the combination, with automatic means for closing the running connections when the motor fails to start with the starting connections closed, of means responsive to the motor speed or the electrical condition of the motor windings for closing the running connections when the motor speed has attained a suitable value, whereby the starting and running connection are controlled to properly accelerate the motor speed to the running value if the motor starts within a predetermined interval after the starting connections are established. In a modified form of the invention, it is proposed to provide an improved starting system incorporating means for automatically establishing running connections to break the motor from rest if the motor fails to start with the starting connections established, and for again establishing starting connections to accelerate the motor as soon as the motor starts to rotate, the running connections being subsequently established when the motor speed reaches a suitable value. The invention further includes an improved method of starting alternating current motors by closing the running connections thereof if the motor fails to start within a predetermined interval with the starting connections closed, and a further starting method in which the motor is accelerated under reduced or starting energization after its rotation has been initiated by full energization.

Various other specific objects, advantages and characteristic features of the invention will become apparent or will be pointed out as the description thereof progresses.

In general, the objects of our invention may be carried out by providing a relay or other suitable device which operates as soon as the motor starts to rotate, and by employing this device to selectively and automatically govern the degree of energization applied to the primary windings of the motor during the initial portion of the starting period in accordance with the torque required to break the motor from rest. In one embodiment of our invention, we provide a time controlled device which acts to increase the energization of the motor primary windings by closing the running connections after the starting connections have been established for a predetermined interval, the operation of this device being governed by a relay responsive to the electrical condition of the secondary windings of the motor, or by equivalent means adapted to operate as soon as the motor starts. The relay may be arranged to operate upon the decrease in frequency in the secondary winding which corresponds to the initial rotation of the motor, and upon such operation preferably acts to prevent an increase in energization of the primary windings by the time controlled device. In this manner, if the torque developed by the motor when the starting connections are closed is not sufficient to break the motor from rest and initiate the rotation thereof within a predetermined interval, automatic means operate to increase the motor energization and torque and thereby to initiate the rotation thereof. In combination with the above described means, certain embodiments of the invention preferably include apparatus for automatically establishing the running connections for the motor after the motor has accelerated to a suitable speed, whereby, when the motor starts to rotate under the torque developed with the starting connections established, the motor is accelerated on reduced energization and is fully energized after such acceleration.

In a further modification of the invention, means are provided for accelerating a motor on reduced energization after full energization has been employed to break the motor from rest the running connections being subsequently established to again provide full energization after the motor has accelerated to a suitable speed. This operation is preferably provided for by employing a time controlled device for establishing the running connections of the motor primary windings or otherwise increasing the energization of the motor after the starting connections have been closed for a predetermined interval, and by further providing a frequency responsive relay or other means which acts as soon as the motor starts to open the running connections to the motor primary windings if previously closed by the time controlled device and to establish starting connections thereto, or to prevent the establishment of running connections by the time controlled device if such connections have not been established before the motor starts. With this arrangement, if the motor starts before the interval of the time controlled device has elapsed, the establishment of running connections by such device is prevented by the frequency responsive relay and the motor is accelerated under reduced energization. On the other hand, if the motor fails to start under reduced energization within the time interval of the time controlled device and increased energization is applied to the windings by such device to start the motor, the motor is nevertheless returned to reduced energization as soon as it starts and is accelerated under reduced energization until its speed reaches a value at which it is appropriate to establish running connections and thereby apply full energization thereto. In this modification of the invention, as in the modification previously referred to, the final application of full energization or the establishment of running connections to the motor after it has accelerated to a suitable speed may be automatically effected by means responsive to the electrical condition of the motor secondary winding, or by other means governed by the motor speed.

In the above explanation of the invention and elsewhere in the specification and claims, the terms "starting" and "running connections" are respectively employed to designate any suitable means for applying reduced or full energization to the motor windings. The reduction in the energization of the motor windings may be effected by the use of transformers, compensators, resistances or any other known voltage or current reducing means, or the energization of a part only of the motor primary windings may be employed to effect this reduction in energization.

The invention will be best understood by reference to the accompanying drawings, in which certain starting systems embodying the invention have been illustrated. In the drawings.

Figure 1:
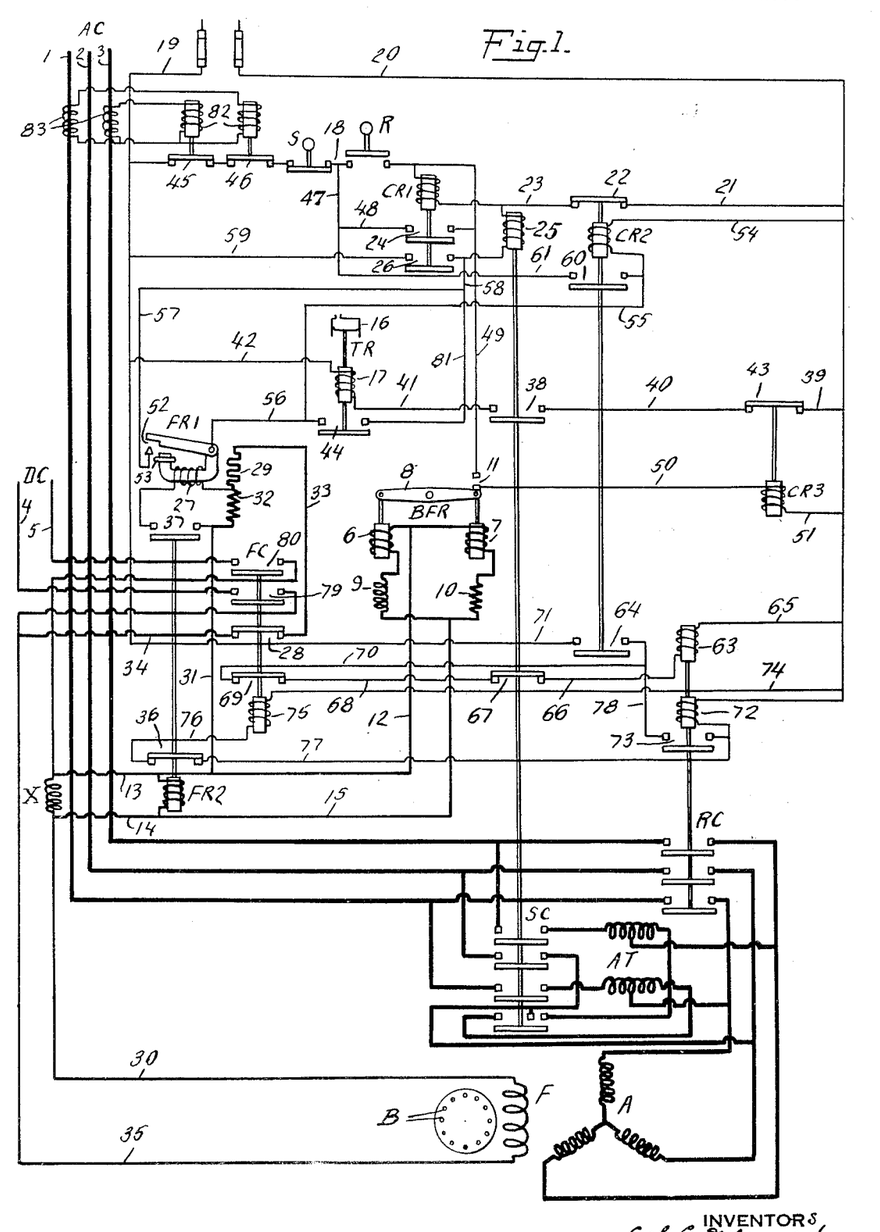
Figure 1 is a diagrammatic representation of a starting system embodying our invention.

Referring to the drawings, and more particularly to Fig. 1, we have shown a synchronous motor having a three-phase star-connected primary winding A, a field winding F and a squirrel cage or damper winding B. The wires 1, 2 and 3 are connected to a power line or other suitable source of three-phase alternating current, and a source of direct current for energizing the field winding F is connected to the wires 4 and 5. A running contactor RC is provided for connecting the motor primary windings A to the power supply wires 1, 2 and 3 and a starting contactor SC is provided for supplying these windings with reduced voltage. In the embodiment shown, an auto-transformer AT is employed to effect the desired reduction in the voltage applied to the primary windings during the starting period, but equivalent means such as a reactor or a resistor may be employed for this purpose. It will be evident from the circuits shown in the drawing, that when the contactor SC is closed, the auto-transformer AT is connected to the power supply wires 1, 2 and 3 and the primary windings A are supplied with reduced voltage from the secondary taps of the auto-transformer. When starting contactor SC is opened and the running contactor RC is closed, the primary windings A are directly connected to the power supply wires 1, 2 and 3, and full line voltage is thus applied to the motor windings.

As explained above, our improved starting system includes a suitable relay or equivalent circuit control means which operates as soon as the motor starts. In the disclosed embodiment, a balance frequency relay BFR is employed for this purpose, and comprises two solenoids 6 and 7 having their armatures respectively connected to the opposite ends of an arm 8 which is pivotally supported at its mid-point, as shown. The solenoid 6 is connected to a control circuit in series with a reactance coil 9, and the solenoid 7 is connected to the same circuit in series with a resistance unit 10. The solenoids and the other elements of the relay are so proportioned and arranged that when alternating current of a predetermined frequency flows in the control circuit, the pull exerted by the solenoid 6 on the arm 8 is just balanced by the pull exerted by the solenoid 7 on this arm, and the arm remains in the position shown. If the frequency of the current in the control circuit decreases from the predetermined value for which the relay is set, an increased proportion of this current flows through the solenoid 6 and the pull exerted by this solenoid on the arm 8 accordingly overcomes the pull exerted thereon by the solenoid 7 and the arm is moved from its balanced position to close the relay contacts 11.

In the disclosed embodiment of the invention, the control circuit of the relay BFR is connected through the wires 12, 13, 14 and 15 across a reactance coil X located in the circuit of the field or secondary winding F of the motor. With this arrangement, the frequency of the current supplied to the relay BFR corresponds to the frequency of the current induced in the motor field winding during the starting period. When the motor primary windings are first energized, a current of line frequency is induced in the field winding, but as soon as the motor starts, the frequency of this induced current decreases. The balance frequency relay is designed to maintain its balanced condition and to hold its contacts 11 open so long as current of line frequency is supplied thereto, and when the motor starts to rotate and the frequency of the reduced field current supplied to the balance frequency relay falls below the line frequency, the relay BFR operates to close its contacts 11.

When the motor is started under normal load conditions, that is, when the torque developed by the motor with the starting connections established is sufficient to start the rotation of the motor, the starting connections are first established by the contactor SC, and after the motor has accelerated to a suitable speed, the running connections are established by the contactor RC. Under adverse load conditions, the motor sometimes fails to start within a predetermined interval with the starting connections established, and in such cases, a slow-acting or time controlled device operates to establish the running connections and so increase the starting torque and initiate the rotation of the motor. In the disclosed embodiment, a timing relay TR is employed for this purpose and is arranged to close its contacts and so establish the running connections of the motor after the starting connections have been established for a predetermined interval provided the motor does not start within this interval. If the motor starts to rotate within the interval of the timing relay, the consequent operation of the balance frequency relay BFR is arranged to prevent the establishment of running connections by the timing relay, as hereinafter more fully explained. The operation of the timing relay may be delayed in any suitable manner, and as shown, a dash pot 16 is provided to prevent the closing of the contacts of this relay until after the operating coil 17 thereof has been energized for a predetermined interval.

The timing relay TR and various other control relays and contactor operating coils of the system are preferably energized from a suitable source of electrical energy connected across the wires 19 and 20. Suitable over-load relays 82 may be connected to current transformers 83 disposed in the alternating power supply circuit, and these relays may be arranged to open control circuits and de-energize the motor upon the flow of excessive current in the primary windings.

Referring now more in detail to the operation of the system of Fig. 1 in starting the motor, and considering a case in which the load conditions are such that the motor will start on reduced energization, the push button R is first depressed to establish an energizing circuit for the starting control relay CR1, which circuit includes the wires 20 and 21, the back contact 22 of the running control relay CR2 and the wires 23, 18 and 19. The energization of the relay CR1 completes a holding circuit for this relay through the front contacts 24 thereof, and also completes an energizing circuit for the starting contactor operating coil 25 through the front contacts 26. The energization of the operating coil 25 closes the starting contactor SC and reduced voltage is accordingly supplied to the motor primary windings A. Since the torque developed with the starting connections established is sufficient to break the motor from rest, the motor starts and accelerates under reduced energization.

When the starting contactor SC closes, an energizing circuit for the timing relay TR is established through the front contacts 38 of the contactor SC and the wires 39, 40, 41 and 42, this circuit also including the normally closed back contacts 43 of the control relay CR3. Since the torque developed by the motor with the starting connections established is sufficient to initiate the operation of the motor within the time interval for which the relay TR is set, the above described energizing circuit for the timing relay is opened before the front contacts 44 of this relay have closed. This operation is effected by the balance frequency relay BFR which closes its contacts 11 as soon as the motor starts, this operation being caused by the decrease in frequency of the induced field current upon the initial rotation of the motor, as explained above. The contacts 11 of the balance frequency relay establish an energizing circuit for the control relay CR3, which circuit may be traced as follows:—from the wire 19, contacts 45 and 46 of the over-load relays 82, push button S, wires 18, 47 and 48, front contacts 24 of relay CR1, wire 49, contacts 11, wire 50, operating coil of relay CR3 and wire 51 to wire 20. The energization of the relay CR3 opens its back contacts 43 and so breaks the energizing circuit for the timing relay TR before the front contacts 44 of this relay have closed, and the momentary energization of the timing relay accordingly has no effect upon the operation of the system.

After the motor has accelerated to a suitable speed, the starting contactor is opened and the running contactor is closed to supply full voltage to the motor primary windings. This transfer from starting to running connections may be automatically effected by means responsive to the motor speed, and it is preferred to employ means responsive to electrical conditions in the secondary or field winding of the motor to effect this operation.

In the disclosed embodiment, a frequency responsive relay FR1 is provided to automatically govern the transfer to running connections, this relay having an operating coil 27 which may be connected in circuit with the secondary winding F of the motor. The winding F is connected to a field contactor FC which is open during the starting period, and when in this position, the back contacts 28 of the field contactor close a circuit through the field winding and the field discharge resistance 29, which circuit may be traced as follows:—from the field winding F through wire 30, reactance coil X, wires 13 and 31, resistance element 32, field discharge resistance 29, wire 33, back contacts 28 of contactor FC and wires 34 and 35 to the field winding F. A frequency relay FR2 is connected across the reactance coil X by means of the wires 13 and 14, and this relay has back contacts 36 and front contacts 37. The operating coil 27 of the frequency responsive relay FR1 is connected across the resistance element 32 through the front contacts 37 of the relay FR2.

When energy is first applied to the motor primary windings A by the starting contactor SC, as described above, a current of slip frequency is induced in the field circuit and a relatively large proportion of this current flows through the coil of the relay FR2 due to the fact that this coil is connected across the reactance X which is in series with the field winding F. The relay FR2 immediately operates to open its contacts 36 and close its contacts 37. The contacts 37 connect the operating coil 27 of the relay FR1 across the resistance element 32. The resistance element 32 has a relatively high resistance, and accordingly, a large part of the induced field current flows through the relay coil 27. When the motor speed reaches a value such that it is appropriate to close the running connections to the primary winding A, the frequency of the induced field current has reached such a low value that the frequency relay FR1 closes its contacts 52. A damper ring 53 on the core of the relay FR1 prevents the closing of the contacts 52 until the frequency of the current in the coil 27 is reduced to a predetermined value corresponding to a motor speed such that the running connections to the primary windings A may be closed without producing an undesirable line surge.

The closing of the contacts 52 of the frequency relay FR1 completes an energizing circuit for the running control relay CR2, this circuit including the wires 54, 55, 56, 57 and 58, the front contacts 26 of the starting control relay CR1 and the wire 59. The energization of the relay CR2 closes its front contacts 60 and thereby completes a holding circuit for this relay through the wire 61. When the relay CR2 is energized, its back contacts 22 open and break the energizing circuit for the starting control relay CR1. Accordingly, the operating coil 25 of the starting contactor SC is de-energized by the opening of the front contacts 26 of the relay CR1, and the starting contactor SC is opened. Immediately after the starting contactor opens, the running contactor RC is closed, its operating coil 63 being energized through a circuit established by the front contact 64 of the running control relay CR2, this circuit including the wires 65 and 66, the back contacts 67 of the contactor SC, the wire 68, the back contacts 69 of the field contactor FC, the wire 70, the front contacts 64 of the relay CR2 and the wires 71 and 19. When the contactor RC closes, it is maintained closed by a locking coil 72 which is energized through the front contacts 73 of the contactor RC and the front contacts 64 of the relay CR2. The closing of the contactor RC supplies full line voltage to the motor primary windings A. Since the energizing circuit for the running contactor operating coil 63 is established through the back contacts 67 of the starting contactor SC, the running connections cannot be established until the starting connections are broken, and in this way, the establishment of short circuits across the auto-transformer AT is avoided.

When the motor reaches a speed near synchronous speed, the energization of the relay FR2 is so reduced that his relay drops, whereupon its contacts 37 are opened and its contacts 36 are closed. The closing of the contacts 36 establishes an energizing circuit for the field contactor FC, which circuit may be traced as follows:—from the wire 20 through wire 74, operating coil 75 of contactor FC, wire 76, back contacts 36 of relay FR2, wire 77, front contacts 73 of the running contactor RC, wire 78, front contacts 64 of relay CR2 and wires 71 and 19. With the field contactor FC thus energized, its back contacts 28 open to break the closed field circuit through the field discharge resistance 29, and its back contacts 69 open to break the above traced energizing circuit for the operating coil 63 of the running contactor RC. The running contactor is maintained closed by the energized locking coil 72 thereof. The front contacts 79 and 80 of the field contactor FC are closed and act to connect the field winding F of the motor with a suitable source of direct current through the wires 4 and 5, and the motor is thus synchronized.

When it is desired to stop the motor, the stop button S is depressed, and the holding circuit for the running control relay CR2 is thereby opened. The relay CR2 is deenergized and its front contacts 64 opened and thereby de-energize the locking coil 72 of the running contactor RC, and this contactor opens and deenergizes the motor primary windings A. The opening of the front contacts 64 of the relay CR2 also breaks the energizing circuit for the operating coil 75 of the field contactor FC, and this contactor also opens, thereby de-energizing the motor field winding F. It will be noted that the energization of either of the overload relays 82 will cause the de-energization of the motor primary and field windings in the same manner as that obtained when the stop button S is depressed.

Referring to the above descriptive operation, if the motor fails to start within a predetermined interval with the starting connections established through the contactor SC, the timing relay TR will close its contacts 44. In this case, the contacts 11 of the balance frequency relay BFR do not close to effect the de-energization of the timing relay because the motor does not rotate and the frequency of the induced field current supplied to the balance frequency relay does not decrease. When the contacts 44 of the timing relay TR close, an energizing circuit for the running control relay CR2 is established through the wires 20, 54, and 55, the contacts 44 of the relay TR, the wires 81 and 58, the front contacts 26 of the starting control relay CR1 and wires 59 and 19. The relay CR2 is thus energized and establishes a holding circuit through its front contacts 60. The energization of the relay CR2 causes the de-energization of the starting control relay CR1 and the consequent de-energization of the operating coil 25 of the starting contactor SC whereupon the starting contactor opens and the starting connections to the motor primary windings are broken. The front contacts 64 of the relay CR2 are closed and the operating coil 63 of the running contactor RC is energized, as explained above, whereupon the running contactor closes to apply full line voltage to the motor primary windings A. The torque developed by this increase in the motor energization starts the motor and the motor accelerates under full energization to a speed approaching synchronous speed, whereupon direct current is supplied to the field windings F by the field contactor FC in the manner described above.

Figure 2:
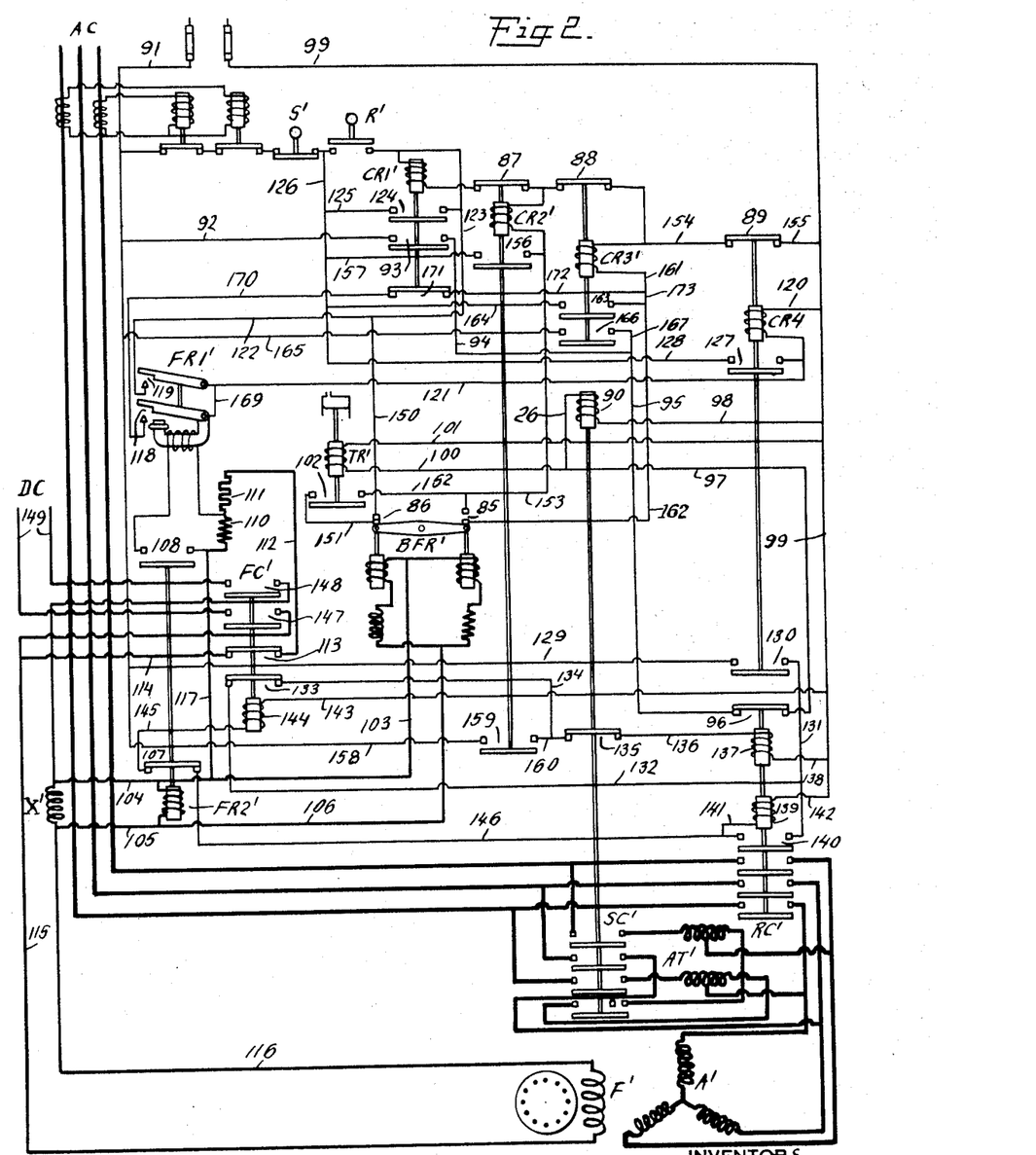
Fig. 2 represents a modified form of the starting system shown in Fig. 1.

As explained above, it is desirable in certain cases to accelerate the motor on reduced energization or with the starting connections established even though full energization or the establishment of running connections has been resorted to in order to break the motor from rest. A suitable control system for effecting this operation is shown in Fig. 2. Since many of the relays, contactors and other devices employed in the system of Fig. 2 are identical with corresponding elements employed in the system of Fig. 1, like reference characters are employed to designate corresponding devices in the two systems and distinguishing exponents are affixed to these reference characters in Fig. 2.

Referring to the system of Fig. 2 the balance frequency relay BFR' employed is provided with two sets of contacts 85 and 86, the contacts 85 being normally opened and the contacts 86 being normally closed. As soon as the motor starts, the relay BFR' is operated by the decrease in frequency in the induced field current in the manner described above in connection with the corresponding relay of Fig. 1, and when so operated, closes the contacts 85 and opens the contacts 86. An additional control relay CR4 is employed in the system of Fig. 2 to establish the running connections to the motor after the motor has been started under full energization and accelerated under reduced energization as hereinafter described.

When the load on the motor is such that the torque developed thereby with the starting connections established is sufficient to initiate the rotation thereof, the system of Fig. 2 operates to start the motor in a manner similar to that described in connection with the system of Fig. 1. Thus, when the starting push button R' is depressed, the starting control relay CR1' is energized through a circuit including the back contacts 87, 88 and 89 of the control relays CR2', CR3' and CR4 respectively, and the energization of the relay CR1' effects the energization of the operating coil 90 of the starting contactor SC' through a circuit which may be traced as follows:—from the wire 91 through wire 92, front contacts 93 of the relay CR1', wires 94 and 95, back contacts 96 of the contactor RC', wires 97 and 26, operating coil 90 of the contactor SC' and wires 98 and 99. With the operating coil 90 thus energized, the starting contactor SC' closes and applies reduced voltage to the motor primary windings A', whereupon the motor starts to rotate.

When the relay CR1', is energized, an energizing circuit for the timing relay TR' is completed through the wires 100, 101 and 99, this circuit being in parallel with the above traced energizing circuit for the operating coil 90. Due to the interval of delay of the timing relay TR', its front contacts 102 do not close immediately after this relay is energized, and if, as has been assumed in the present case, the motor starts to rotate under reduced energization within this interval, the balance frequency relay BFR' operates to open its contacts 86 and so break the circuit to the contacts 102 of the timing relay before the contacts 102 have closed. This operation of the balance frequency relay annuls or avoids any effect on the system due to the closing of the timing relay contacts 102. The balance frequency relay BFR' is connected through the wires 103, 104, 105 and 106 across the reactance coil X', and since this coil is connected in a closed circuit through the field winding F' during the starting period, induced field current flows through the balance frequency relay windings. The initial reduction in the frequency of the induced field current when the motor starts to rotate causes the operation of the relay BFR' in the manner explained above in connection with the corresponding relay of Fig. 1.

When the starting connections are established by the contactor SC', the relay FR2' is energized by the induced field current and opens its back contacts 107 and closes its front contacts 108. The contacts 108 connect the operating coil 109 of the frequency relay FR1' across the resistance unit 110, which unit is connected in series with the field winding F' through the field discharge resistance 111, the wire 112, back contacts 113 of the field contactor FC', wires 114, 115 and 116, reactance coil X' and wires 104 and 117. When the motor speed reaches a value such that it is appropriate to close the running connections to the primary windings A', the frequency of the induced field current has reached such a low value that the frequency relay FR1' closes its contacts 118 and 119. The control relay CR4 is now energized through a circuit including the wires 99 and 120, wire 121, contacts 119 of the relay FR1', wires 122 and 123, front contacts 124 of relay CR1' and wires 125, 126 and 91. As soon as the relay CR4 is energized, a holding circuit for this relay is completed through front contacts 127 thereof and the wires 128 and 126. The energization of the relay CR4 opens its back contacts 89 and so breaks the energizing circuit for the starting control relay CR1'. The deenergization of the relay CR1' breaks the above traced energizing circuit for the starting contactor SC' at the contacts 93, and the starting connections to the motor primary windings A' through the auto-transformer AT' are broken. As soon as the contactor SC' opens, an energizing circuit for the running contactor RC' is completed, which circuit may be traced as follows:—from the wire 91, through wire 129, front contacts 130 of the relay CR4, wires 131 and 132, back contacts 133 of the field contactor FC', wires 134 and 160, back contacts 135 of the starting contactor SC', wire 136, operating coil 137 of the running contactor RC' and wire 138 to wire 99. Once energized and closed, the running contactor RC' is maintained closed by its locking coil 139, which coil is energized through a circuit including the wires 91 and 129, front contacts 130 of the relay CR4, wire 131, front contacts 140 of the contactor RC' and wires 141, 142 and 99. The closing of the contactor RC' applies full line voltage to the motor primary windings A'.

When the motor speed reaches a value near synchronism, the energization of the relay FR2' is so reduced that this relay drops whereupon its contacts 108 are opened and its contacts 107 are closed. The closing of the contacts 107 establishes an energizing circuit for the field contactor FC', which circuit may be traced as follows:— from the wire 99, wire 143, operating coil 144 of the contactor FC', wire 145, contacts 107 of the relay FR2', wire 146, contacts 140 of the contactor RC', wire 131, contacts 130 of the relay CR4 and wire 129 to wire 91. With the field contactor FC' thus energized, its back contacts 113 open to break the closed field circuit through the field discharge resistance 111, and its back contacts 133 open to break the above traced energizing circuit for the operating coil 137 of the running contactor RC'. The contactor RC' is maintained closed by the energized locking coil 139 thereof. The front contacts 147 and 148 of the field contactor FC' are closed and act to connect the field winding F' of the motor with a suitable source of direct current through the wires 149 and the motor is thus synchronized.

If the motor fails to start within the time interval of the relay TR' with the starting connections established, the balance frequency relay BFR' does not operate and the closing of the contacts 102 of the timing relay TR' consequently causes the establishment of running connections to the motor primary windings whereby sufficient torque is developed to start the motor. When the timing relay contacts 102 close before the motor is started, an energizing circuit for the relay CR2' is established through the closed contacts 86 of the balance frequency relay BFR', which circuit may be traced as follows:—from the wire 91, through the stop push button S', wires 126 and 125, contacts 124 of the relay CR1', wires 123 and 150, contacts 86 of the relay BFR', wire 151, contacts 102 of the relay TR', wires 152 and 153, operating coil of the relay CR2', back contacts 88 of the relay CR3', wire 154, back contacts 89 of the relay CR4 and wire 155 to wire 99. Once energized, the relay CR2' is maintained energized through a holding circuit including its front contacts 156 and the wires 157 and 126. The energization of the relay CR2' opens the energizing circuit for the relay CR1' at the contacts 87, and the consequent deenergization of the relay CR1' opens its contacts 93 and thus breaks the above traced energizing circuit for the operating coil 90 of the starting contactor SC'. The starting contactor SC' opens and closes its back contacts 135. As soon as the starting contactor opens, an energizing circuit for the operating coil 137 of the running contactor RC' is established by the relay CR2' as follows:— from the wire 91, wire 158, front contacts 159 of the relay CR2', wire 160, back contacts 135 of the starting contactor SC', wire 136, operating coil 137 of the contactor RC' and wire 138 to wire 99. The running contactor RC' is thus closed and full line voltage is applied to the motor primary windings A'.

With the running connections established, the motor starts and the rotation thereof reduces the frequency of the induced field current and causes the operation of the balance frequency relay BFR' whereby its contacts 86 are opened and its contacts 85 are closed. The control relay CR3' is now energized through a circuit including the wire 155, the back contacts 89 of the control relay CR4, the wire 154, the wires 161, 173 and 162, the contacts 85 of the relay BFR', the wire 153, the front contacts 156 of the relay CR2' and the wires 157 and 126 to the wire 91. Once energized, the control relay CR3' is maintained energized through a holding circuit including its front contacts 163 and the wires 164 and 126. The energization of the relay CR3' breaks the energizing circuit for the relay CR2' at the back contacts 88, and the relay CR2' drops and opens its front contacts 159 and thus breaks the energizing circuit for the operating coil 137 of the running contactor RC'. The motor primary windings A' are accordingly momentarily deenergized but as soon as the running contactor RC' is opened, the operating coil 90 of the starting contactor SC' is energized through a circuit which may be traced as follows:—From the wire 91, wire 165, front contacts 166 of the relay CR3', wires 167 and 95, back contacts 96 of the running contactor RC', wires 97 and 26, starting contactor operating coil 90 and wire 98 to wire 99.

The starting connections to the motor primary windings are thus re-established after the motor has been started by the temporary establishment of running connections, and the motor accelerates under reduced energization. When the motor speed reaches a value such that it is appropriate to apply full line voltage to the primary windings thereof, the frequency relay FR1' closes its contacts 118, and establishes an energizing circuit for the relay CR4, which circuit may be traced as follows:—from the wire 99, wire 120, operating coil of relay CR4, wires 121 and 169 contacts 118 of relay FR1', wire 170, back contacts 171 of relay CR1', wires 172 and 173, front contacts 163 of relay CR3' and wires 164 and 126 to wire 91. The energization of the relay CR4 completes an energizing circuit for the operating coil 137 of the running contactor RC' through the contacts 130 in the manner described above, and the closing of the contactor RC' applies full line voltage to the motor primary windings A'. The running contactor RC' is maintained closed by the energization of its locking coil 139 in the manner explained above. The motor continues to accelerate under full energization, and when the motor speed reaches a value near synchronous speed, the relay FR2' is deenergized, the field contactor FC' is energized and the motor is synchronized as explained above.

As explained above, the reduction in motor energization during the starting period may be effected by employing a motor having a primary winding comprising two or more winding sections and by successively energizing these winding sections as the motor accelerates. The present invention contemplates the selective starting of motors in this manner, and suitable systems for automatically effecting this control have been shown in Figs. 3 and 4. The system of Fig. 3 is designed to normally start the motor with a part only of the primary winding sections energized and to automatically energize all of the primary winding sections if the motor does not start within a predetermined interval with a part only of the primary winding sections energized.

Figure 3:
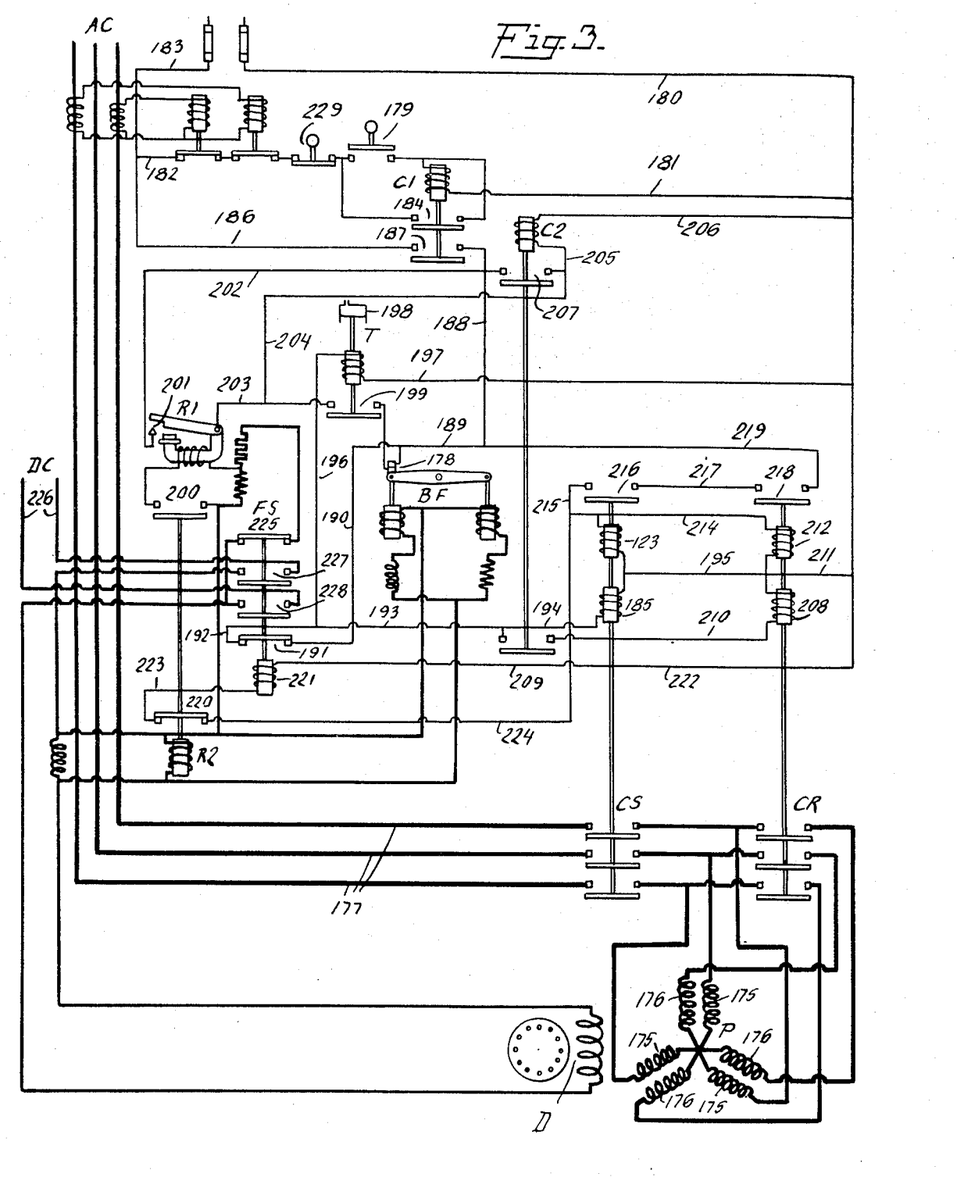
Figs. 3 and 4 represent starting systems embodying certain modifications of our invention as applied to motors having primary windings comprising a plurality of winding sections.

The motor of Fig. 3 is provided with a primary winding P comprising two sections 175 and 176, the several phases of which are connected to a common neutral point, as shown. A starting contactor CS is provided to connect the winding section 175 to the alternating current power line 177 and a running contactor CR is arranged to connect the winding section 176 to this line, the circuits through which these connections are established being obvious from the drawings. A balance frequency relay BF is provided and is connected across a reactance coil R which is connected in a closed circuit through the field or secondary winding D during the starting period. Thus, the relay BF is supplied with induced field current when the motor starts and this relay is arranged to operate and open its contacts 178 when the frequency of the induced field current drops below the line frequency as the motor starts.

Considering the operation of the system in Fig. 3 in starting the motor and assuming that the motor load is such that the torque developed upon the energization of the winding section 175 alone is sufficient to initiate the rotation of the motor, the starting push button 179 is first depressed and the relay C1 is energized through a circuit including the wires 180, 181, 182 and 183. Once energized, the relay C1 is maintained energized through a holding circuit including its front contacts 184. When the relay C1 closes, it completes an energizing circuit for the operating coil 185 of the starting contactor CS, which circuit may be traced as follows:—From the wire 183, wire 186, front contacts 187 of the relay C1, wires 188, 189 and 190, back contacts 191 of the field contactor FS, wires 192, 193 and 194, operating coil 185 and wires 195 and 211 to wire 180. The contactor CS is thus closed to complete the starting connections by energizing the primary winding section 175, whereupon the motor starts to rotate. The front contacts 187 of the relay C1 also close an energizing circuit for the timing relay T which circuit includes the wires 196 and 197.

Due to the action of the dash pot 198 or other suitable delay means, the relay T does not close its contacts 199 until it has been energized for a predetermined interval, and since in the case under consideration the motor starts within this interval, the balance frequency relay BF is operated and opens its contacts 178 before the contacts 199 of the timing relay close. Accordingly, in the case under consideration, the closure of the timing relay contacts 199 has no effect on the operation of the system.

When the primary winding section 175 is first energized, the induced field current energizes the frequency relay R2 and this relay closes its contacts 200. The motor accelerates with the winding section 175 energized and when the motor speed reaches an appropriate value, the frequency relay R1 closes its contacts 201 and an energizing circuit for the control relay C2 is established as follows:—From the wire 183, wire 186, front contacts 187 of the relay C1, wire 202, contacts 201 of the relay R1, wires 203, 204 and 205, operating coil of the relay C2 and wires 206 and 180. Once energized, the relay C2 is maintained energized through a circuit including its front contacts 207 and the front contacts 187 of the relay C1. The energization and closing of the relay C2 establishes an energizing circuit for the operating coil 208 of the running contactor CR, which circuit may be traced as follows:— From the wire 183, wire 186, contacts 187 of the relay C1, wires 188, 189 and 190, back contacts 191 of the field contactor FS, wires 192 and 193, front contact 209 of the relay C2, wire 210, operating coil 208 and wire 211 to wire 180. The contactor CR is thus closed and the primary winding section 176 is energized. When the running contactor CR closes, the locking coils 212 and 213 of the running and starting contactors CR and CS are energized through a circuit including the wires 211 and 195, the coils 212 and 213 in parallel, the wires 214 and 215, contacts 216 of the contactor CS, wire 217, contacts 218 of the contactor CR, wires 219 and 188, contacts 187 of the relay C1 and wire 186 to wire 183.

When the motor speed approaches synchronism, the energization of the frequency relay R2 is reduced to a point at which this relay drops and closes its contacts 220, and an energizing circuit for the operating coil 221 of the field contactor FS is completed through the wires 222 and 223, the contacts 220, wires 224 and 215 and the front contacts 216 and 218 of the starting and running contactors CS and CR. The energization of the operating coil 221 closes the field contactor FS whereby the closed field circuit is opened at the contact 225 and direct current from the wires 226 is connected to the field winding D through the contacts 227 and 228. In this manner, the motor is synchronized. The closing of the field contactor FS opens its back contacts 191 and thus breaks the energizing circuit for the operating coils 185 and 208 of the starting and running contactors. These contactors are, however, maintained closed by their energized locking coils 212 and 213. The motor may be deenergized by depressing the push button 229 and thus deenergizing the control relay C1, the locking coils 212 and 213 of the running and starting contactors and the field contactor FS.

If the motor fails to start with the primary winding section 175 alone energized, the balance frequency relay BF will not operate to open its contacts 178, and after a predetermined interval, the timing relay T will close its contacts 199 and establish an energizing circuit for the control relay C2, which circuit may be traced as follows:—From the wire 180, wire 206, relay C2, wires 205 and 204, contacts 199 of the timing relay T, contacts 178 of the balance frequency relay BF, wires 189 and 188, contacts 187 of the relay C1 and wire 186 to wire 183. The energization of the relay C2 causes the energization of the running contactor operating coil 208 in the manner explained above, and in this manner, the contactor CR is closed and the motor primary winding section 176 is energized. The motor is accordingly started under full energization and is subsequently synchronized at an appropriate speed in the manner explained above.

Figure 4:
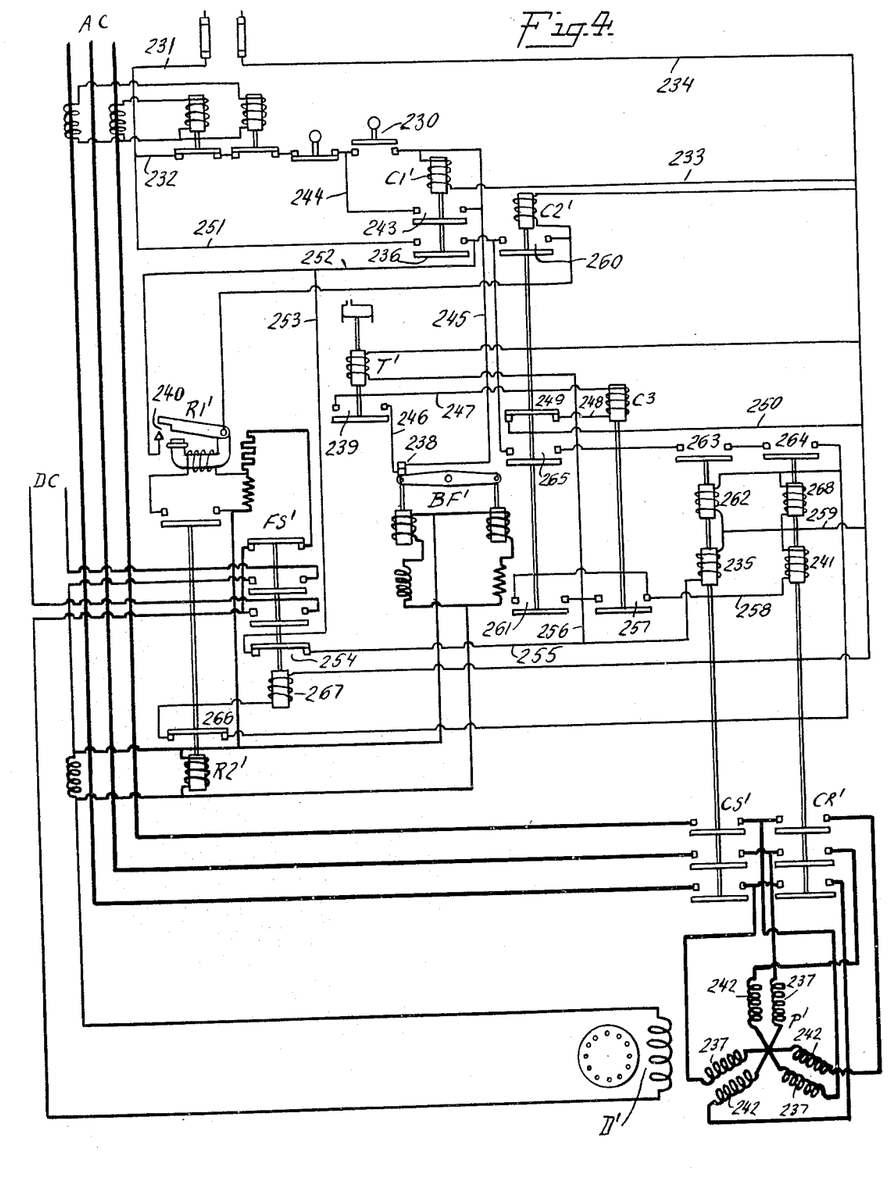

In Fig. 4 we have illustrated a suitable system for accelerating the motor with part only of the primary windings energized after the entire primary windings have been energized to start the motor. The system of Fig. 4 is similar in certain respects to that of Fig. 3 and accordingly, like reference characters with distinguishing exponents have been employed to designate corresponding elements and devices in these figures. The system of Fig. 4 will be best understood from an explanation of the operation thereof in starting the motor under various load conditions.

When the load is such that the motor will start with a part only of the primary winding sections energized, the system of Fig. 4 operates to start the motor in the manner described above in connection with the system of Fig. 3. Thus, when the push button 230 is depressed, the relay C1' is energized through the wires 231, 232, 233 and 234, and this relay is maintained energized through a holding circuit including its front contact 243. The operating coil 235 of the starting contactor CS' is energized through a circuit including the front contacts 236 of the relay C1' and the primary winding section 237 of the motor is accordingly energized and the motor starts to operate. The closing of the relay C1' energizes the timing relay T', but the balance frequency relay BF' operates as the motor starts and opens its contacts 238 before the timing relay contacts 239 close, and thus the energization of the timing relay T' does not effect the starting operation. When the motor has accelerated to an appropriate speed, the frequency relay R1' closes its contacts 240 and completes an energizing circuit for the relay C2', and when thus energized, this relay is maintained energized through a holding circuit including its front contacts 260. The energization of the relay C2' closes its front contacts 261, and so completes an energizing circuit for the operating coil 241 of the running contactor CR', this circuit including the front contacts 236 of the relay C1' and the back contacts 254 of the field contactor FS'. The running contactor CR' is thus closed and the primary winding section 242 is energized. The contactors CS' and CR' are maintained closed by the energization of their locking coils 262 and 268, the energizing circuit for these coils being completed through the front contacts 263 and 264 of the starting and running contactors and the front contacts 265 of the relay C2'. When the motor speed approaches synchronism, the frequency relay R2' drops and closes its back contacts 266, thereby energizing the operating coil 267 of the field contactor FS'. The field contactor closes and applies direct current to the field winding D', whereby the motor is synchronized.

If the motor fails to start within the predetermined interval of the timing relay T', the balance frequency relay BF' does not open its contacts 238 during this interval and when the contacts 239 of the timing relay close, an energizing circuit for the relay C3 is completed as follows:—From the wire 231, wires 232, and 244, front contacts 243 of the relay C1′, wire 245, contacts 238 of the relay BF′, wire 246, contacts 239 of the relay T′, wire 247, operating coil of the relay C3, wire 248, back contacts 249 of the relay C2′ and wire 250 to wire 234. The energization of the relay C3 completes an energizing circuit for the operating coil 241 of the running contactor CR′, which circuit may be traced as follows:—From the wire 231 through wire 251, front contacts 236 of the relay C1′, wires 252 and 253, back contacts 254 of the field contactor FS′, wires 255 and 256, front contacts 257 of the relay C3, wire 258, operating coil 241 and wire 259 to wire 234. The closing of the running contactor CR′ establishes running connections by energizing the winding section 242, and the motor is started under full energization of the primary windings. Since the relay C2′ is not energized, the locking coils 262 and 268 of the contactors CS′ and CR′ are not energized, and the contactors are held closed by their operating coils 235 and 241 only. In this connection, it should be noted that the relay C3 is energized through the back contacts 249 of the relay C2′ which are closed only when this relay is de-energized, and further, that the contacts 265 of the relay C2′, which are open when this relay is de-energized, are included in the energizing circuit for the contactor locking coils 262 and 268. Accordingly, the relay C3 is energized to establish running connections only when the relay C2′ is de-energized, and under these conditions, the locking coils of the contactors cannot be energized.

As soon as the motor starts, the frequency of the induced field current is reduced to a value below line frequency and the balance frequency relay BF′ consequently operates and opens its contacts 238. The above traced energizing circuit for the relay C3 is thus broken by the balance frequency relay, and the operating coil 241 of the running contactor CR′ is deenergized by the opening of the contacts 257. The motor now accelerates under starting connections, the primary winding section 237 being energized and the section 242 being de-energized.

After the motor has accelerated to an appropriate speed, the running connections to the primary winding P′ are again closed by the energization of the relays R1′ and C2′ and the consequent energization of the operating coil 241 of the contactor CR′. The motor is subsequently synchronized by the de-energization of the frequency relay R2′ and the consequent energization of the field contactor FS′, all as described above. In this manner, the motor is selectively started under reduced or full energization depending upon the starting torque requirements, and in either case, the motor is accelerated under reduced energization after the rotation thereof has been initiated.

It will be readily apparent that the motor starting systems described in illustrating our invention may be altered in various respects without departing from the scope of the invention. Thus, our selective starting means may be used in combination with resistors, reactors and various other voltage or current reducing devices in place of the auto-transformers shown in Figs. 1 and 2, and if desired, the starting torque may be automatically increased when necessary by applying over-voltage to the motor primary windings. The frequency at which the balance frequency relays employed are arranged to operate may be varied in order that increased energization may be supplied to the motor upon its failure to accelerate to any desired speed short of synchronism. Further, the number of primary winding sections employed in the systems of the types shown in Figs. 3 and 4 may be increased as desired, and the starting torque accordingly increased in any desired number of steps.

We claim:

1. The method of starting an electric motor having a primary winding comprising at least two winding sections which comprises energizing one of the winding sections, energizing both of the winding sections after a predetermined interval if the motor fails to start within such interval with one of the winding sections energized, and de-energizing one of the winding sections after the motor has been started with both of the winding sections energized.

2. In combination with an alternating current motor, starting and running connections for said motor, means for closing the starting connections, means for closing the running connections with the motor stationary if the motor does not start within a predetermined time interval with the starting connections closed and means for preventing such closing of the running connections after said predetermined time interval provided the motor starts within said interval.

3. In combination with an alternating current motor, starting and running connections for said motor, means for closing said starting connections, means for normally closing said running connections after the motor has accelerated to a predetermined speed, means for closing the running connections when the motor is at a standstill if the motor does not start within a predetermined interval with said starting connections closed and means for preventing such closing of the running connections after said predetermined interval provided the motor starts within said interval.

4. In combination with an alternating current motor having a secondary winding and a primary winding, a source of alternating current, starting and running connections between said source and said primary winding, means for closing said starting connections, delayed means for closing said running connections a predetermined interval after the starting connections are closed, and means operated by a decrease in the frequency of the current in said secondary winding for preventing the closing of the running connections by said delayed means.

5. The combination of an alternating current motor having a primary winding, starting and running conections for said primary winding, means for establishing said starting connections, means for establishing said running connections provided the motor does not start within a predetermined interval with said starting connections established and means operated in response to the rotation of the motor for again establishing said starting connections after the rotation of the motor has been initiated with the running connections established.

6. The combination of an alternating current motor, starting and running connections for the motor, means for establishing said starting connections, time delayed means for establishing said running connections after said starting connections have been established for a predetermined interval, and means responsive to the rotation of the motor for preventing the establishment of running connections by said delayed means if the motor starts to rotate within said predetermined interval with the starting connections established.

7. The combination of an alternating current motor, starting and running connections for the motor, means for establishing said starting connections, delayed means for establishing said running connections after said starting connections have been established for a predetermined interval, means responsive to the rotation of the motor for preventing the establishment of running connections by said delayed means if the motor starts to rotate within said predetermined interval with the starting connections established and means for establishing the starting connections after the motor starts to rotate with the running connections established.

8. The combination of an alternating current motor having a primary winding and a secondary winding, starting and running connections for said primary winding, means for establishing said starting connections, means for establishing the running connections after the starting connections have been established for a predetermined interval, means responsive to the electrical condition of the secondary winding for preventing the establishment of running connections if the motor starts within said predetermined interval with the starting connections established, and further means responsive to the electrical condition of the secondary winding for again establishing running connections after the motor has accelerated to a predetermined speed.

9. The combination of an alternating current motor having a primary winding and a secondary winding, starting and running connections for said primary winding, means for establishing said starting connections, delayed means for establishing the running connections after the starting connections have been established for a predetermined time interval, means responsive to the electrical condition of the secondary winding for preventing the establishment of the running connections by said delayed means if the motor starts to rotate within said predetermined interval with the starting connections established, means for reestablishing the starting connections to accelerate the motor after the running connections have been established by said delayed means and the motor has started to rotate and further means responsive to the electrical condition of the secondary winding for again establishing running connections after the motor has accelerated to a predetermined speed.

10. The combination of an alternating current motor having a primary winding and a secondary winding and starting and running connections for said primary winding, means for establishing the starting connections, time delayed means for establishing the running connections after the starting connections have been established for a predetermined interval and means responsive to a decrease in the frequency of the current induced in the secondary winding for preventing the establishment of running connections by said delayed means if the frequency of said induced current decreases a predetermined amount with the starting connections established during said predetermined interval.

11. The combination of an alternating current motor having a primary winding and a secondary winding and starting and running connections for said primary winding, means for establishing the starting connections, time delayed means for establishing the running connections after the starting connections have been established for a predetermined interval, means responsive to a decrease in the frequency of the current induced in the secondary winding for preventing the establishment of running connections by said delayed means if the frequency of said induced current decreases a predetermined amount before the running connections have been established by said delayed means and further means responsive to the frequency of the current induced in the secondary winding for establishing running connections after the motor has accelerated to a predetermined speed.

12. The combination of an alternating current motor having a primary winding and a secondary winding and starting and running connections for said primary winding, means for establishing the starting connections, time delayed means for establishing the running connections after the starting connections have been established for a predetermined interval, means responsive to a decrease in the frequency of the current induced in said secondary winding for preventing the establishment of the running connections by said delayed means if the frequency of said induced current decreases a predetermined amount before the running connections have been established by the time delayed means, means for reestablishing the starting connections after the running connections have been established by said delayed means and the motor has started and further means responsive to the frequency of the current induced in the secondary winding for establishing the running connections after the motor has accelerated to a predetermined speed.

13. The combination of an electric motor having a primary winding comprising a plurality of winding sections, a source of alternating current, means for connecting one of said winding sections to said source and means for connecting all of said sections to said source without disconnecting said one section therefrom if the motor fails to start within a predetermined interval with one of said sections connected to said source.

14. The combination of an electric motor having a primary winding comprising a plurality of winding sections, a source of alternating current, means for connecting one of said winding sections to said source, means for connecting all of said sections to said source if the motor fails to start within a predetermined interval with one of said sections connected to said source and means for disconnecting one of said sections from said source after the motor has started to rotate with all of said winding sections connected to said source.

15. The combination of an alternating current motor having a primary winding comprising at least two winding sections, means for energizing one of said winding sections, delayed means for energizing the other of said winding sections after said one winding section has been energized for a predetermined interval and means for preventing the energization of said other winding section by said delayed means if the motor starts to rotate within said interval with said one winding section energized.

16. The combination of an alternating current motor having a secondary winding and a primary winding comprising at least two winding sections, means for energizing one of said winding sections, delayed means for energizing all of the winding sections after said one winding section has been energized for a predetermined interval, means responsive to the electrical condition of the secondary winding for preventing the energization of all of said winding sections by said delayed means if the motor starts to rotate within said predetermined interval with said one winding section energized, and means for deenergizing all but one of said winding sections to accelerate the motor under reduced energization after the rotation of the motor has been initiated by the energization of all of said winding sections.

17. The combination of an alternating current motor having a secondary winding and a primary winding comprising two winding sections, means for energizing one of said winding sections, delayed means for energizing the other of said winding sections after said one section has been energized for a predetermined time interval, means responsive to the electrical condition of the secondary winding for preventing the energization of said other winding section by said delayed means if the motor starts to rotate within said predetermined interval with said one winding section energized, means for deenergizing said other winding section after the rotation of the motor has been initiated with both of said winding sections energized and further means responsive to the electrical condition of said secondary winding for energizing said other winding section after the motor has accelerated to a predetermined speed.

18. The combination of an alternating current motor having a secondary winding and a primary winding comprising two winding sections, means for energizing one of said winding sections, delayed means for energizing the other of said winding sections after said one section has been energized for a predetermined time interval, means responsive to the frequency of the current induced in said secondary winding for preventing the energization of said other winding section by said delayed means if the motor starts to rotate within said predetermined time interval with said one winding section energized and means including said frequency responsive to means for deenergizing said other winding section after the rotation of the motor has been initiated with both of said winding sections energized.

19. The combination of an alternating current motor having a primary winding, a source of alternating current, means for reducing the voltage of said source, means for connecting said primary winding to said source through said voltage reducing means, delayed means for connecting said primary winding directly to said source if the motor fails to start within a predetermined interval with said source connected to said winding through said voltage reducing means and means responsive to the rotation of the motor for preventing the operation of said delayed means if the motor starts to rotate within the interval of said delayed means.

20. The combination of an alternating current motor having a primary winding, a source of alternating current, means for supplying reduced voltage from said source to said primary winding, means for supplying full voltage from said source to said primary winding if the motor fails to start within a predetermined interval with reduced voltage supplied to said primary winding and means for again supplying reduced voltage to said primary winding after the motor has started to rotate with full voltage supplied to said primary winding.

21. The combination of an alternating current motor having a primary winding, a source of alternating current, means for supplying reduced voltage from said source to said primary winding, delayed means for supplying full voltage from said source to said primary winding after reduced voltage has been supplied thereto for a predetermined time interval and means for preventing the supply of full voltage to said winding by said delayed means if the motor starts to rotate within said predetermined interval with reduced voltage supplied to the primary winding.

22. The combination of an alternating current motor having a primary winding and a secondary winding, a source of alternating current, means for supplying reduced voltage from said source to said primary winding, delayed means for supplying full voltage from said source to said primary winding after reduced voltage has been supplied thereto for a predetermined interval, means responsive to the electrical condition of said secondary winding for preventing the supply of full voltage to said primary winding by said delayed means if the motor starts to rotate within said predetermined interval with reduced voltage supplied to the primary winding and means for again supplying reduced voltage to the primary winding after the rotation of the motor has been initiated with full voltage applied to the primary winding.

23. The combination of an alternating current motor having a primary winding and a secondary winding, a source of alternating current, means for supplying reduced voltage from said source to said primary winding, delayed means for supplying full voltage from said source to said primary winding after the reduced voltage has been supplied thereto for a predetermined interval, means responsive to the electrical condition of said secondary winding for preventing the supply of full voltage to said primary winding by said delayed means if the motor starts to rotate within said predetermined interval with reduced voltage supplied to the primary winding, means for again supplying reduced voltage to the primary winding after the rotation of the motor has been initiated with full voltage applied to the primary winding and further means responsive to the electrical condition of said secondary winding for supplying full voltage to the primary winding after the motor has accelerated to a predetermined speed.

ROY A. CROSBY.
CARL C. NELSON.